US00RE37017E

(19) United States
(12) Reissued Patent
Stanzani et al.

(10) Patent Number: US RE37,017 E
(45) Date of Reissued Patent: Jan. 16, 2001

(54) LASER-BEAM BAR CODE READER

(75) Inventors: Giuseppe Stanzani, Bologna; Claudio Mazzone, Crespellano, both of (IT)

(73) Assignee: Datalogic S.p.A., Lippo di Calderara di Reno (IT)

(21) Appl. No.: 08/921,045

(22) Filed: Aug. 29, 1997

Related U.S. Patent Documents

Reissue of:
(64) Patent No.: 5,446,267
Issued: Aug. 29, 1995
Appl. No.: 08/191,241
Filed: Feb. 3, 1994

U.S. Applications:
(63) Continuation of application No. 07/772,712, filed on Oct. 7, 1991, now abandoned.

(30) Foreign Application Priority Data

Oct. 9, 1990 (IT) ..... 3679/90

(51) Int. Cl.[7] ..... G06K 7/10
(52) U.S. Cl. ..... 235/440; 235/441; 235/462; 235/467
(58) Field of Search ..... 235/440, 441, 235/455, 494, 462, 463, 464, 466, 467, 462.25; 250/236

(56) References Cited

U.S. PATENT DOCUMENTS

| | | | | |
|---|---|---|---|---|
| Re. 36,251 | * | 7/1999 | Marchi | 235/462.25 |
| 4,315,245 | * | 2/1982 | Nakahara et al. | 235/455 |
| 4,508,422 | * | 4/1985 | Karlsson | 250/236 |
| 4,704,519 | * | 11/1987 | Kulikaukas | 235/494 |
| 5,042,619 | * | 8/1991 | Kohno | 235/440 |
| 5,552,590 | * | 9/1996 | Obata et al. | 235/455 |

FOREIGN PATENT DOCUMENTS

| | | | |
|---|---|---|---|
| 3311352 | * | 3/1984 | (DE) . |
| 360250 | * | 3/1990 | (EP) . |

* cited by examiner

*Primary Examiner*—Trong Phan
(74) *Attorney, Agent, or Firm*—Sughrue, Mion, Zinn, Macpeak & Seas, PLLC

(57) ABSTRACT

Bar code reader including two sources which are enabled to emit respective laser beams with a cyclic alternation; the laser beams are focused by optical elements on two different regions of a read area. Reflected rays from the read area are processed by a decoding unit operatively connected to the laser-beam sources so that when the presence of a code in the read area is detected, only the laser beam which is focused on the region in which the bar code is present remains enabled.

22 Claims, 3 Drawing Sheets

LASER-BEAM BAR CODE READER

Matter enclosed in heavy brackets [ ] appears in the original patent but forms no part of this reissue specification; matter printed in italics indicates the additions made by reissue.

CROSS REFERENCE TO RELATED APPLICATION

This application is a file wrapper continuation of application Ser. No. 07/772,712 filed Oct. 7, 1991 now abandoned.

BACKGROUND OF THE INVENTION

The present invention relates to a bar code reader which uses a laser beam.

DISCUSSION OF THE RELATED ART

The use of a laser beam generated by a solid-state diode or by a NeHe gas tube to read bar codes is known.

In order to read the bar code, the laser beam is first focused by means of an appropriate optical system and then deflected by means of a polygonal rotor fitted with mirrors, which is rotated rapidly so as to perform a periodic scanning of the region in which the bar code is located.

In applications of this type, the image of the laser source in the focusing point must remain within very precise limits which are in practice set by the thickness of the bars of the code. The reading of the code would in fact be erroneous if the wavefront of the beam had such a diameter as to cover more than two bars.

Moreover, if the source of the laser beam is a solid-state diode, the emitted light beam has a spherical divergent wavefront.

In order to keep the diameter of the light beam within the limits which allow to decode the bar code, the use of an optical system arranged in front of the laser source, which focuses the light beam at a preset distance from the concentration lens, is known. By way of example, FIG. 1 schematically illustrates the method of operation of such a known focusing system.

In FIG. 1, the reference numeral 1 indicates the laser source and the numeral 2 indicates the lens which concentrates the light beam in a point P which has a distance d from the lens. Once the point P has been passed, the light beam diverges again, so that its diameter remains within the limits required for practical use only in a rather narrow region 2s around the focusing point P.

Outside the region 2s thus defined, the diameter of the laser beam is greater than the thickness of the bars of the code, and accordingly the light signal received by the reader does not allow a correct reconstruction of the alternation of the light and dark bars of the code.

The narrowness of the focusing region furthermore reduces the scanning area of the laser beam, and ultimately the read area is reduced, such read area being shown by FIGS. 2 and 3, which illustrate two read areas A1 and A2 which have an equal width at a different distance from the laser source, depending on the location of the focusing point of the laser beam.

In order to expand the read area, for example to read an area equal in width to the sum of the widths of A1 and A2, solutions have already been proposed which entail movable focusing systems driven by an external sensor. These systems allow to vary the focusing point and thus adapt the optical system to the point in which the passage of the bar code occurs, so that the reading capability is thus increased in practice.

However, such systems are disadvantages for the following reasons: a) the need arises for an external sensor which detects the position of the bar code and activates the variation of the focusing point;

b) a slowness in reacting to the activation of the sensor occurs, since the focusing point is changed by means of a mechanical movement, the execution whereof requires a long time;

c) the possibility of error presents itself, due to an incorrect match between the placement of the bar code and the dimensions of the object on which it is applied; and, d) low reliability becomes inherent.

SUMMARY OF THE INVENTION

The technical aim of the present invention is therefore to provide a bar code reader which can operate on a significantly larger read area and does not have the disadvantages described above in conventional readers.

This aim is achieved by a laser-beam bar code reader, according to the present invention, as defined in the appended claims.

BRIEF DESCRIPTION OF THE DRAWINGS

Further advantages and characteristics will become apparent from the following description on the basis of the accompanying drawings, wherein.

DESCRIPTION OF THE PREFERRED EMBODIMENTS

Figure 1:
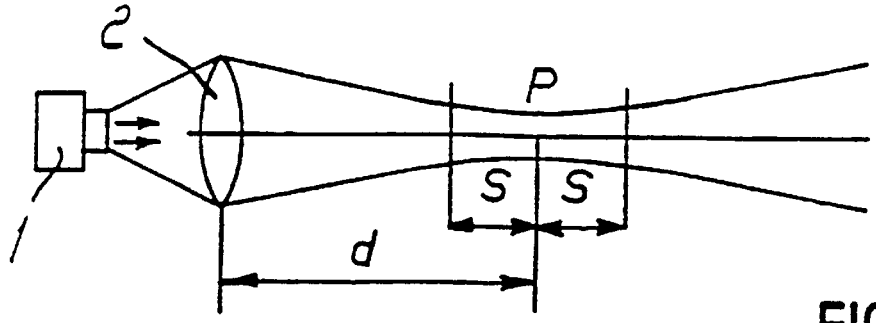
FIG.1 PRIOR ART
FIG. 1 illustrates the method of operation of a conventional focusing system.
Figure 2:
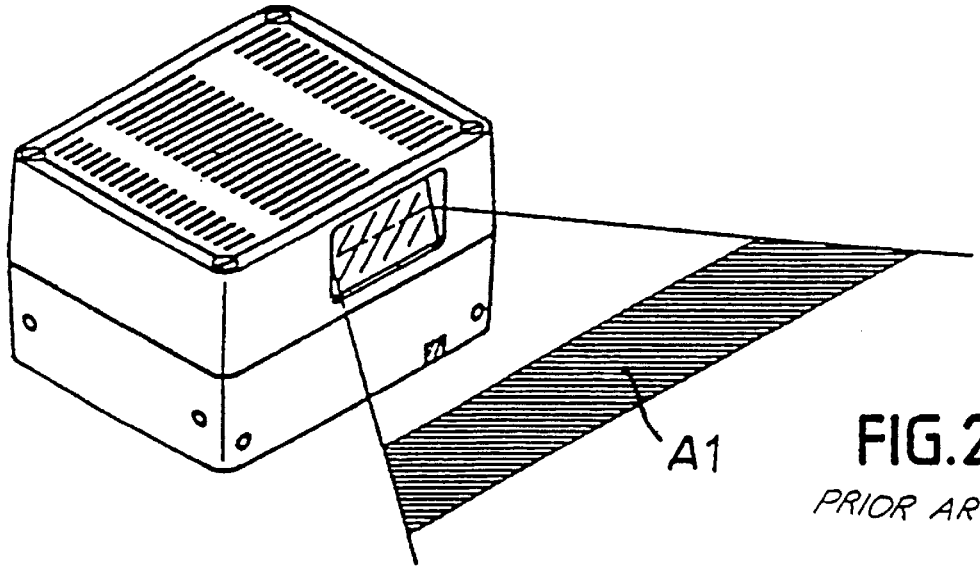
FIG.2 PRIOR ART
FIGS. 2–3 illustrate two read areas A1 and A2, respectively, achieved by the above conventional focusing system.
Figure 3:
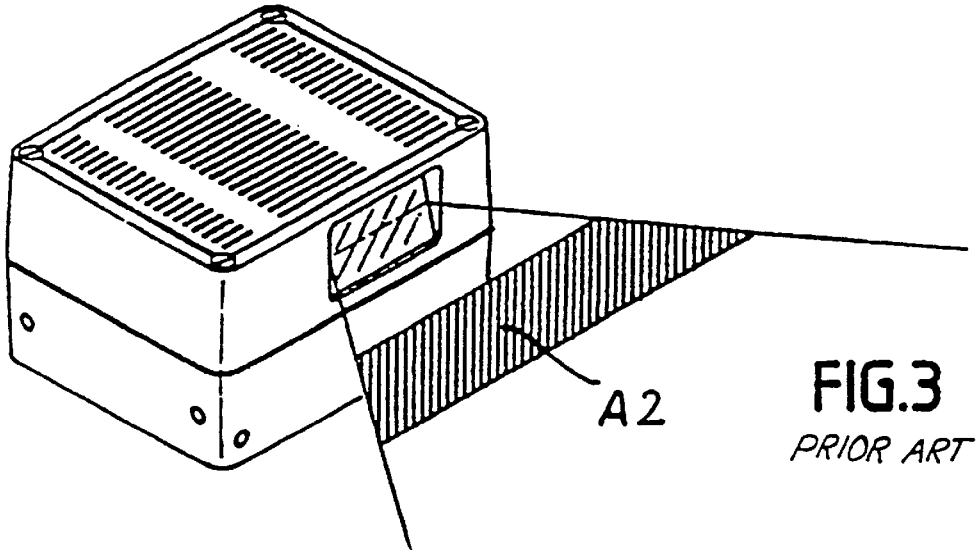
FIG.3 PRIOR ART
Figure 4:
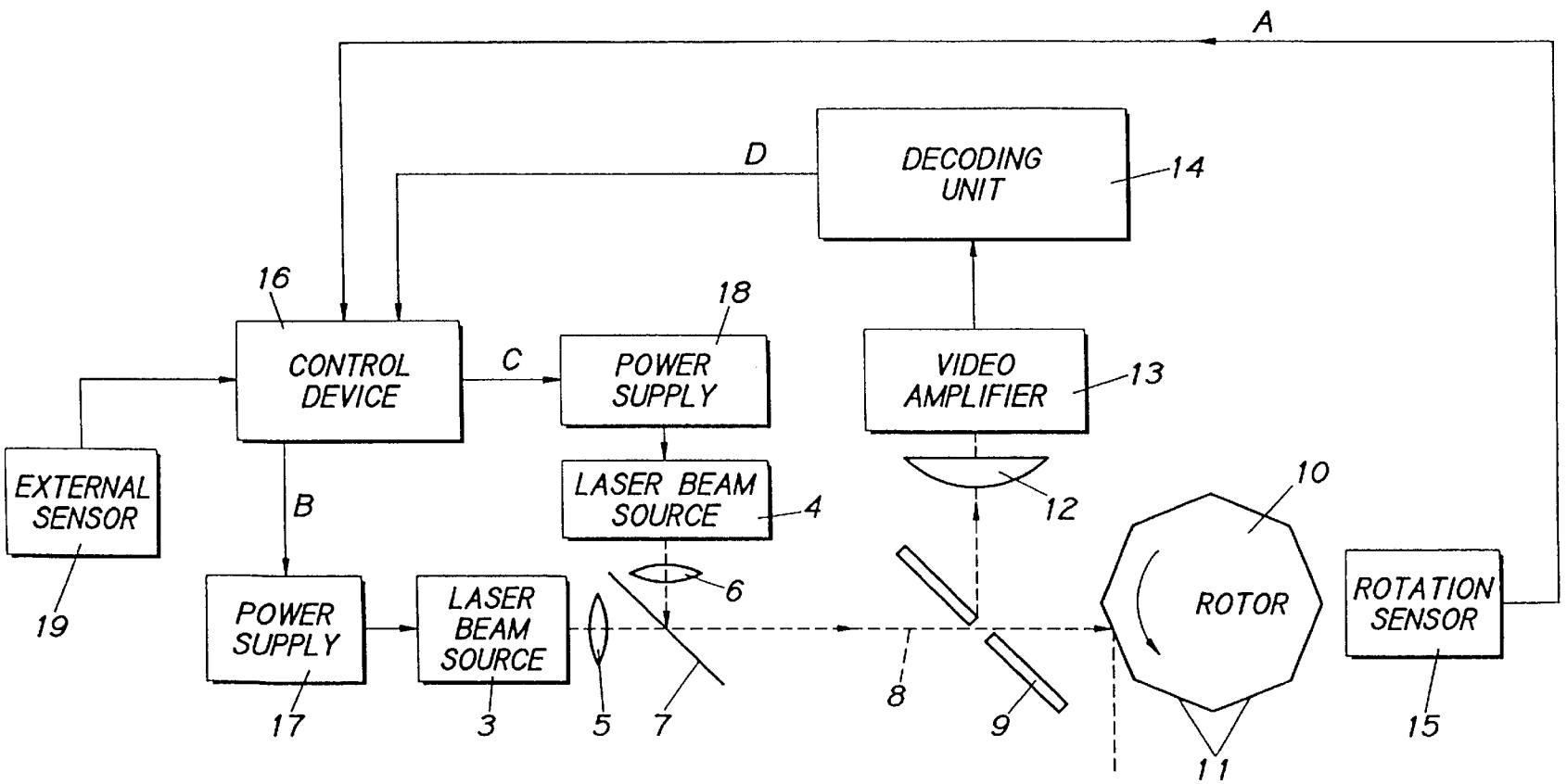
FIG. 4 is a block diagram of the reader according to the present invention.

With reference to FIG. 4, the numerals 3 and 4 indicate two laser beam sources, for example constituted by solid-state diodes of the type commercially known by the code TOLD 9211 and manufactured by the Toshiba company (Japan).

The beams at the output of the diodes are mutually perpendicular and are focused at different distances by respective optical assemblies 5 and 6. The beam arriving from the optical assembly 5 is sent through a semi-reflecting mirror 7 which is arranged at the intersection point of the beams and reflects the beam arriving from the assembly 6.

Figure 6:
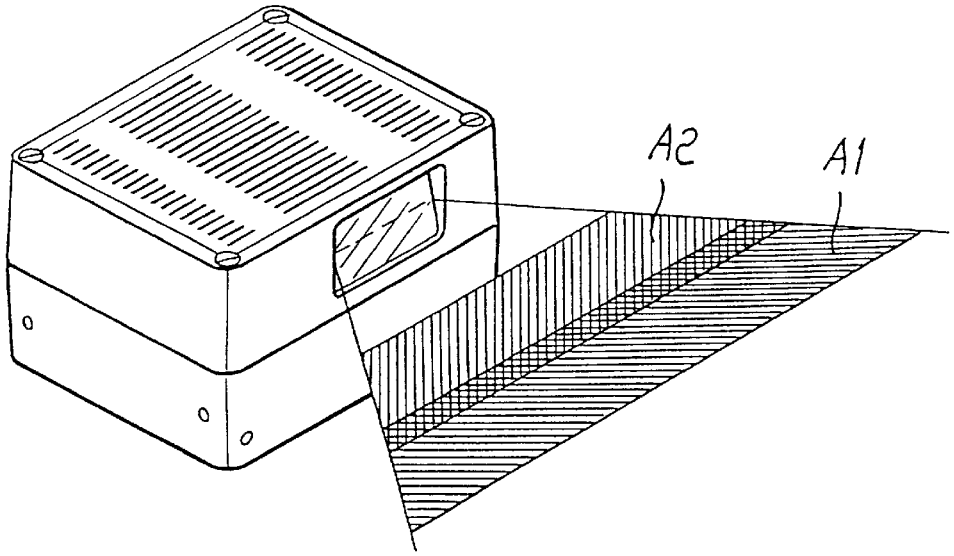
FIG. 6 is a view of the read area achieved by the reader according to the present invention.

The angles of incidence of the laser beams arriving from the optical assemblies 5, 6 with respect to the mirror 7 are chosen so as to generate a unidirectional beam 8 which is directed, through a hole of an optical receiver assembly 9, onto a polygonal rotor 10. The polygonal rotor 10 comprises a plurality of peripheral mirrors 11 which, by means of the rotation of the rotor 10, scan a preset read area. As shown in FIG. 6 the read area includes the two areas A1 and A2 which are alternately scanned by the laser beam sources. The intersection area between A1 and A2 which is scanned by both sources is represented in double hatched lines.

The beam reflected from the read area is deflected by said rotor and by the receiver assembly 9 toward an optical return system 12 and then to the input of a video amplifier 13 which provides to a microprocessor-based decoding unit 14 a signal which corresponds to the image of the area scanned by the laser beam.

A rotation sensor 15 is operatively associated with the rotor 10 and provides, for each mirror 11 which passes in front of it, a signal which actuates a control device 16 which can alternately activate the power supplies 17, 18 of the two diodes 3 and 4.

More precisely, the signals supplied by the sensor 15 occur in the form of pulses A and which are emitted at regular intervals in the period of transition between one mirror and the subsequent one during the rotation of the rotor 10.

The control device 16 alternatively activates, upon each pulse A arriving from the sensor 15, the power supplies 17, 18 of the two laser diodes 3 and 4 if the scanning of the read area has not detected the presence of a code. Vice versa, if the scanning determines the presence of a code, the control device 16 keeps active the power supply of the diode which has produced the laser beam which has identified the code.

The above described reader operates as follows. If no code is present in the read area, the pulses A alternate, as mentioned, the activation of the two power supplies 17 and 18 with a frequency f=1/T, where T is the period which elapses between two pulses.

Therefore, while the power supply 17 receives a level "1" signal, with the corresponding switching on of the diode 3 for the period T, the power supply 18 receives a level "0" signal which keeps the diode 4 switched off for the same period T.

Figure 5:
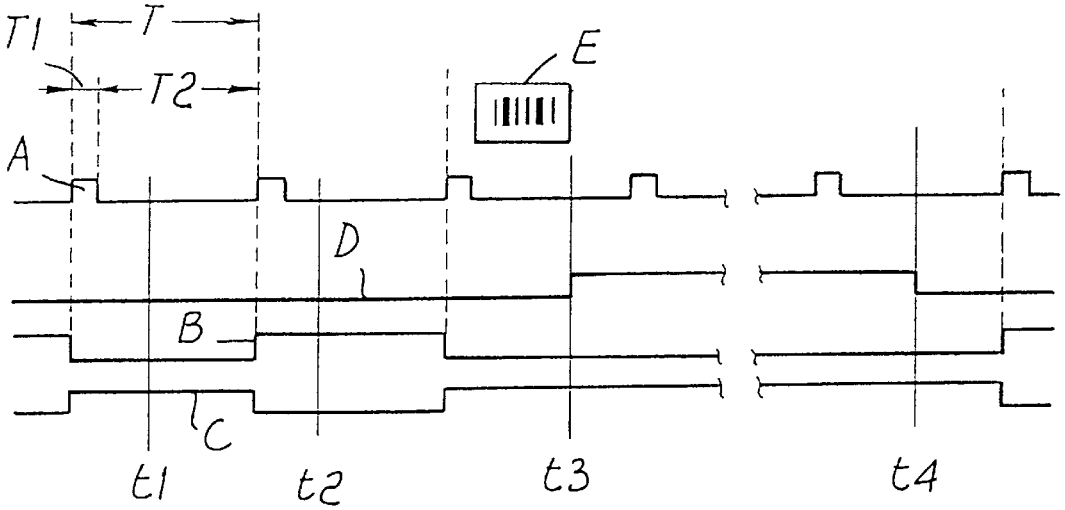
FIG. 5 charts the time sequence of the signals at the output of some blocks.

The duration T1 of the pulses is used to complete the switching of the diodes, and no scanning of the read area is performed during this time. During the time T2 until the subsequent pulse A, the read area is scanned by the laser beam emitted by the diode 3, 4 which is connected to the power supply which receives, at that instant, the level "1" signal from the control device; the other power supply is blocked by the level "0" signal. In FIG. 5, the signal sent to the power supply 17 is indicated by B and the one sent to the power supply 18 is indicated by C.

The alternation of the signals B and C is controlled by the signal D at the output of the decoding unit 14, which can assume two levels, "1" and "0", depending on whether the presence of a bar code in the read area is detected or not.

From what has been described above, it is evident that the rotor 10, by means of the sensor 15, synchronized with the power supplies 17, 18, so that each mirror of the rotor reflects onto the region to be scanned the laser beam emitted by the power supply which has received the level "1" signal at that instant. Since the laser beams emitted by the diodes 3, 4 are focused on two different areas A1 and A2 (see FIG. 6), the alternation in emission also produces the alternation in the scanning of the two regions A1 and A2 which compose the read area.

In fact, if the scanning is performed with the mirror N1 in the instant t1, the signal B of the power supply 17 is at level "0" and therefore the diode 3 is off, whereas the signal C of the power supply is at level "1" and therefore the diode 4 is on, so that the region A2, on which the beam emitted by the diode 4 is focused, is scanned.

In the instant t2, scanning is performed by the subsequent mirror N2, so that since the signal B and C are respectively at level "1" and "0" the region A1 is scanned by the beam emitted by the diode 3.

The image of the scanning area is reflected in each instance by the optical assembly 9 and sent to the decoding unit 14, and when said decoding unit identifies a bar code E therein, the output signal D changes level, thus indicating, even before the code is decoded, the presence of a probable useful data item.

The change in level of the signal D is interpreted by the control device 16 as a command for locking the power supplies 17, 18 in the state in which they are at that instant. For example, in FIG. 5, at the instant t3 the change in level from "0" to "1" of the signal D causes the locking of the signal B at level "0" and of the signal C at level "1", so that the subsequent scans are performed by the same laser beam, in this case by the beam emitted by the diode 4, which is focused in the region A2 explored thereby, where the presence of the code has been detected. At the end of decoding, or when the code is removed from the read area (instant t4) the signal D returns to level "0", restoring the alternating scan.

As can be seen, the described reader perfectly achieves the intended aim. In particular, it should be noted that the cyclic scanning of the regions which compose the read area with laser beams, each of which is focused on a respective region, allows a high read probability.

Furthermore, since no mechanical focusing of the laser beams on the read area is required, the read times are very short.

The invention is susceptible to numerous modifications and variations, all of which are within the scope of the protection. For example, the number of laser sources can be higher than two, so as to include a larger read area.

A further variated embodiment provides the driving of the power supplies on the part of an external sensor *19* which can detect the presence of the code. In this case, the signal D is no longer necessary, since switching from one power supply to the other is controlled by the external sensor.

Another possibility provides the continuous switching of the reading from region A1 to region A2, regardless of the presence of the code. In this case a simpler electronic circuitry is obtained, but half of the scans cannot be used since they are performed on an area in which the code is not present.

We claim:

1. A laser-beam bar code reader, including one single scanner unit, said unit comprising:

at least two laser beam sources;

an electric control means having an input which receives timing pulses and at least two outputs connected to said at least two laser beam sources, said outputs assuming two opposing logical states, said electric control means being connected to change the logical state of said at least two outputs with each timing pulse, such as to alternately enable said sources to emit respective laser beams, said electric control means being further connected to disable alternate operation and lock said outputs in their current states upon receipt of a disable signal;

an optical means receiving the alternatively emitted laser beams, said optical means being suitable for directing the alternatively emitted beams onto a read area and for independently focusing each of said beams onto different preset regions which form said read area, said optical means being suitable for directing the beams reflected from said area to optical return means; and a processing means connected between said optical return means and a further input of said electric control means, said processing means being suitable for detecting the presence of a bar code in one of said regions of said read area according to the data received from said optical return means and for generating said disable signal upon detection of the presence of a bar code in a region of said area, said disable signal causing said electric control means to lock said at least two laser beam sources in their instant states, such that only the laser source which emits the beam which is focused on said region in which the bar code is present remains in an active state.

2. Reader according to claim 1, wherein each of said at least two laser beam sources comprises a respective solid-state diode.

3. Reader according to claim 1, wherein each of said at least two laser beam sources comprises a respective power supply.

4. Reader according to claim 1, wherein said optical means includes:

at least two optical assemblies for focusing the laser beams emitted by said at least two sources onto two different regions which form said read areas, said beams intersecting one another;

a semireflecting mirror arranged in the intersection point of said beams so that both said beams are reflected through said semireflecting mirror, the angles of incidence being chosen so as to generate a unidirectional beam;

a receiver assembly provided with a hole through which said unidirectional beam is guided; and a polygonal rotor with mirrors which is arranged after said receiver assembly and is suitable for deflecting said unidirectional beam onto a read area so as to scan it, said optical receiver assembly being suitable for directing the beam reflected from said read area toward said optical return means.

5. Reader according to claim 4, wherein said optical return means includes:

a video amplifier which is suitable for providing a signal which corresponds to the image of the scanned area to said processing means detecting said signal.

6. Reader according to claim 5, further comprising a rotation sensor means which is operatively associated with said polygonal rotor such that to generate said timing pulses corresponding to the passage of one mirror of said polygonal rotor, said rotation sensor being connected to said input of electric control means.

7. A laser-beam bar code reader, including one single scanner unit, said unit comprising:

at least two laser beam sources;

an electric control means having an input which receives timing pulses and at least two outputs connected to said at least two laser beam sources, said outputs assuming two opposing logical states, said electric control means being connected to change the logical state of said at least two outputs with each timing pulse, such as to alternately enable said sources to emit respective laser beams, said electric control means being further connected to disable alternate operation and lock said outputs in their current states upon receipt of a disable signal;

an optical means receiving the alternatively emitted laser beams, said optical means being suitable for directing the alternatively emitted beams onto a read area and for directing the beams reflected from said read area to optical return means, said optical means being suitable for independently focusing each of said beams onto different preset regions which form said read area; and an electric control means having an input which receives timing pulses and at least two outputs connected to said at least two laser beam sources, said outputs assuming two opposing logical states, said electric control means being connected to change the logical state of said at least two outputs with each timing pulse, such as to alternately enable said sources to emit respective laser beams, said electric control means being further connected to disable alternate operation and lock said outputs in their current states upon receipt of a disable signal;

an optical means receiving the alternatively emitted laser beams, said optical means being suitable for directing the alternatively emitted beams onto a read area and for independently focusing each of said beams onto different preset regions which form said read area, said optical means being suitable for directing the beams reflected from said area to optical return means; and a processing means connected between said optical return means and a further input of said electric control means, said processing means being suitable for detecting the presence of a bar code in one of said regions of said read area according to the data received from said optical return means and for generating said disable signal upon detection of the presence of a bar code in a region of said area, said disable signal causing said electric control means to lock said at least two laser beam sources in their instant states, such that only the laser source which emits the beam which is focused on said region in which the bar code is present remains in an active state.

external sensors connected to a further input of said electric control means, said sensors being suitable for detecting the presence of the code on an object in a region of said read area and for generating said disable signal upon detection of the presence of a bar code in a region of said read area, said disable signal causing said electric control means to lock said at least two laser beam sources in their instant states the entire time during which the object remains within said region of said read area, such that only the laser source which emits the beam which is focused on said region in which the bar code is present remains in an active state.

8. A laser-beam bar code reader, including one single scanner unit, said unit comprising:

first means for generating a first laser beam;

second means for generating a second laser beam; directing and focusing means for directing said first laser beam and said second laser beam along a mutual direction and for focusing said first laser beam to define a first read area and for focusing said second laser beam to define a second read area, said first read area defining a first width extending along said mutual direction and said second read area defining a second width also extending along said mutual direction, said first width and said second width extending along different portions of said mutual direction;

a control means operatively connected to said first and said second means for generating said first and said second laser beam, said control means being suitable to alternately enable said first and said second means for generating said first and said second laser beam in dependence upon externally generated timing pulses, said control means being further connected to disable alternate operation and lock said outputs in their current states upon receipt of a disable signal; and a detection means for detecting a reflected beam from said read areas, said detection means generating said disable signal when a reflected beam is detected, said detection means being operatively connected to said control means for locking said control means when said disable signal is generated, such that only one of the means for generating said laser beams which is focused on the read area associated to the reflected beam remains in an active state.

9. A laser-beam bar code reader, including one single scanner unit, said unit comprising:

at least two laser beam sources which are supplied by respective power supplies;

at least two optical assemblies for focusing the laser beams emitted by said sources onto different regions which form a read area;

an optical means suitable for superimposing the sources of said beams, which thus become coincident in terms of direction and origin so as to generate a unidirectional beam;

a receiver assembly provided with a hole through which said unidirectional beam is guided;

a deflecting rotating mirror means with mirrors arranged after said receiver assembly and suitable for deflecting said unidirectional beam onto said read area so as to perform the scanning thereof, said optical receiver assembly being suitable for directing the beam reflected from said read area toward a video amplifier which is suitable for providing a signal which corresponds to the image of the scanned area to a unit for decoding said signal, said decoding unit generating an enable signal when it does not detect the presence of a bar code in one of the regions of the read area;

a device for controlling said laser beam sources which is controlled by said decoding unit and by a rotation sensor which detects the rotation of said mirror means, said device for controlling comprising a timing input receiving timing pulses generated by said rotation sensor, an enable input receiving said enable signal from said decoding unit and at least two outputs connected to said laser beam sources and assuming two opposing logical states, said device for controlling being connected to change with each timing pulse the logical state of said output lines while said enable signal is active, so as to alternatively activate the sources of the laser beams and thus alternatively scan the regions which form the read area, whereas when said enable signal is low said device for controlling is connected to enable only the laser beam which is focused on the region of the read area in which the bar code is present.

10. A laser-beam bar code reader, including one single scanner unit, said unit comprising:

two sources of laser beams which are powered by respective power supplies;

two optical assemblies for focusing the laser beams emitted by said sources onto two different regions which form a read area, said beams intersecting one another;

a semireflecting mirror arranged in the intersection point of said beams so that one of said beams is reflected and the other one through said semireflecting mirror, the angles of incidence being chosen so as to generate a unidirectional beam;

a receiver assembly provided with a hole through which said unidirectional beam is guided;

a rotating deflecting mirror means with mirrors which are arranged after said receiver assembly and are suitable for deflecting said unidirectional beam onto said read area so as to scan it, said optical receiver assembly being suitable for directing the beam reflected from said read area toward a video amplifier which is suitable for providing a signal which corresponds to the image of the scanned area to a unit for decoding said signal, said decoding unit generating an enable signal when it does not detect the presence of a bar code in one of the regions of said read area;

a device for controlling said laser beam sources which is controlled by said decoding unit and by a rotation sensor which detects the rotation of the rotating mirror, said device for controlling comprising a timing input receiving timing pulses generated by said rotation sensor, an enable input receiving said enable signal from said decoding unit and at least two outputs connected to said laser beam sources and assuming two opposing logical states, said device for controlling being connected to change with each timing pulse the logical state of said output lines while said enable signal is active, so as to alternatively activate the laser beam sources and thus alternatively scan the regions which form the read area, whereas when said enable signal is not active the device for controlling is connected to enable only the source the laser beam whereof is focused on the region of the read area in which the bar code is present.

11. A laser-beam bar code reader, including one single scanner unit, said unit comprising:

at least two laser beam sources which are supplied by respective power supplies;

at least two optical assemblies for focusing the laser beams emitted by said sources onto different regions which form a read area;

an optical means suitable for superimposing the sources of said beams, which thus become coincident in terms of direction and origin so as to generate a unidirectional beam;

a receiver assembly provided with a hole through which said unidirectional beam is guided;

a polygonal rotor with mirrors arranged after said receiver assembly and suitable for deflecting said unidirectional beam onto said read area so as to perform the scanning thereof;

a video amplifier, said optical receiver assembly being suitable for directing the beam reflected from said read area toward said video amplifier, said video amplifier being connected to generate a signal which corresponds to the image of the scanned area;

a decoding unit receiving said signal, said decoding unit generating an enable signal when it does not detect the presence of a bar code in one of the regions of the read area; and a device for controlling said laser beam sources, said device being controlled by said decoding unit and by a rotation sensor which detects the rotation of the polygonal rotor, said device for controlling comprising: a timing input receiving timing pulses generated by said rotation sensor, an enable input receiving said enable signal from said decoding unit, and at least two outputs connected to said laser beam sources and assuming two opposing logical states, said device for controlling being connected to change with each timing pulse the logical state of said output lines while said enable signal is active, so as to alternatively activate the sources of the laser beams and thus alternatively scan the regions which form the read area, whereas when said enable signal is low said device for controlling being connected to enable only the source the laser beam which is focused on the region of the read area in which the bar code is present.

12. Laser-beam bar code reader, including one single scanner unit, said unit comprising:

two sources of laser beams which are powered by respective power supplies;

two optical assemblies for focusing the laser beams emitted by said sources onto two different regions which form a read area, said beams intersecting one another;

a semireflecting mirror arranged in the intersection point of said beams so that one of said beams is reflected and the other one through said semireflecting mirror, the angles of incidence being chosen so as to generate a unidirectional beam;

a receiver assembly provided with a hole through which said unidirectional beam is guided;

a polygonal rotor with mirrors which is arranged after said receiver assembly and is suitable for deflecting said unidirectional beam onto said read area so as to scan it;

a video amplifier, said optical receiver assembly being suitable for directing the beam reflected from said read area toward said video amplifier, said video amplifier being connected to generate a signal which corresponds to the image of the scanned area;

a decoding unit receiving said signal, said decoding unit generating an enable signal when it does not detect the presence of a bar code in one of the regions of said read areas; and a device for controlling said laser beam sources which is controlled by said decoding unit and by a rotation sensor which detects the rotation of the polygonal rotor, said device for controlling comprising:

a timing input receiving timing pulses generated by said rotation sensor, an enable input receiving said enable signal from said decoding unit, and at least two outputs connected to said laser beam sources and assuming two opposing logical states, said device for controlling being connected to change with each timing pulse the logical state of said output lines while said enable signal is active, so as to alternatively activate the laser beam sources and thus alternatively scan the regions which form the read area, whereas when said enable signal is not active the device for controlling is connected to enable only the source the laser beam whereof is focused on the region of the read area in which the bar code is present.

*13. Laser-beam bar code reader including one single scanner unit, said unit comprising:*

*at least two laser beam sources;*

*power supply means for enabling said sources to emit respective laser beams;*

*optical focusing means suitable for focusing the emitted beams,*

*optical means for directing the focused beams on read areas and for directing the beams reflected from said areas to processing means;*

*electric control means for activating the power supply means to emit said laser beams;*

*each of said laser beams being focused by the optical focusing means on read areas defined at preset different distances from the laser-beam bar code reader along substantially the same scanning path.*

*14. Laser-beam reader according to claim 13, wherein said optical means is adapted to superimpose the beams emitted by said sources and focused at different distances from the laser-beam bar code reader, so as to generate a unidirectional beam.*

*15. Laser-beam reader according to claim 14, wherein said beams are intersecting one another and in that said optical means comprises a semi-reflecting mirror, arranged at the intersection point of the beams, so that one of said beams is reflected and the other one passes through the semi-reflecting mirror, the angles of incidence of said beams onto the mirror being chosen so as to generate said unidirectional beam.*

*16. Laser-beam reader according to claim 14, wherein said optical means comprises a receiver assembly provided with a hole through which said unidirectional beam is guided, a polygonal rotor being arranged after said receiver assembly for deflecting said unidirectional beam onto one of said read areas so as to perform the scanning thereof.*

*17. Laser-beam reader according to claim 16, wherein said receiver assembly directs the beam reflected from said read areas towards a video amplifier which is suitable for providing a signal which corresponds to the image of the scanned area to a unit for decoding said signal.*

*18. Laser-beam reader according to claim 17, wherein said electric control means is controlled by said decoding unit and by a rotation sensor operatively associated with the rotor, so that when the decoding unit does not detect the presence of a bar code in the read areas, the electric control means is enabled by the rotation sensor so as to alternatively activate the laser beam sources and thus alternatively scan the read areas, whereas when the decoding unit detects the presence of a bar code in the read areas, the electric control means enables only the source of the laser beam which is focused on the read area in which the bar code is present.*

*19. Laser-beam reader according to claim 13, wherein said laser beam sources comprise a solid-state diode.*

*20. Laser-beam reader according to claim 13, further comprising an external sensor for detecting the presence of a bar code on an object so as to activate the source of the laser beam which is focused on the read area where the bar code is present for the entire time during which the object remains within the read area.*

*21. Laser-beam reader according to claim 13, wherein the processing means, upon detection of the presence of a bar code in one of said read areas, selectively activates said electric control means so as to cause them to enable only the source which emits the beam which is focused on said area and to disable the remaining source.*

*22. Laser beam reader according to claim 13, wherein said electric control means activates the power supply means to emit said laser beams with cyclic alternation.*

* * * * *